United States Patent [19]
Sawyer et al.

[11] Patent Number: 5,658,509
[45] Date of Patent: Aug. 19, 1997

[54] METHOD FOR FORMING A RECYCLABLE SEAL ON AN AUTOMOTIVE CLIMATE CONTROL SYSTEM DOOR

[75] Inventors: Robert S. Sawyer, Farmington Hills; Leroy E. Schopieray, Canton, both of Mich.

[73] Assignee: Ford Motor Company, Dearborn, Mich.

[21] Appl. No.: 554,008

[22] Filed: Nov. 6, 1995

[51] Int. Cl.$^6$ .............................. B29C 44/06; B29C 44/12
[52] U.S. Cl. .............................. 264/46.4; 264/50; 264/252; 425/812
[58] Field of Search ..................... 425/812; 264/50, 264/46.4, 46.5, 46.6, 252, 45.5

[56] References Cited

U.S. PATENT DOCUMENTS

| | | | |
|---|---|---|---|
| 3,654,013 | 4/1972 | Willsie et al. | 264/252 |
| 3,737,169 | 6/1973 | Federal-Mogul . | |
| 4,626,391 | 12/1986 | Taylor | 264/46.6 |
| 4,670,069 | 6/1987 | Debbaut et al. | 156/79 |
| 4,670,199 | 6/1987 | Montet et al. | 425/812 |
| 4,720,363 | 1/1988 | Mayumi et al. | 425/812 |
| 4,740,346 | 4/1988 | Freeman | 264/102 |
| 4,839,117 | 6/1989 | Swenson et al. | 264/46.5 |
| 4,957,672 | 9/1990 | Carter et al. | 264/46.5 |
| 4,965,030 | 10/1990 | Thorn | 425/812 |
| 5,098,271 | 3/1992 | Yanagishita | 425/812 |
| 5,110,085 | 5/1992 | Iwasawa | 425/812 |
| 5,116,558 | 5/1992 | Wrobel et al. | 264/46.6 |
| 5,164,136 | 11/1992 | Comert et al. | 264/46.5 |
| 5,364,574 | 11/1994 | Panayappan et al. | 264/46.5 |
| 5,382,397 | 1/1995 | Turner, Jr. | 264/46.5 |

*Primary Examiner*—Allan R. Kuhns
*Attorney, Agent, or Firm*—David B. Kelley

[57] ABSTRACT

A recyclable seal is formed on the surface of a climate control system door by placing the door into a mold having channels for receiving a foammelt, forming the foammelt by melting a solid sealant material and mixing a foaming agent therewith, supplying the foammelt mixture under a predetermined pressure to the mold so as to flow through the channels and through openings in the door to form an interconnected seal on opposite sides thereof, venting the channels along substantially the entire length thereof so as to maintain a relatively low differential pressure across the foammelt mixture to force the foaming agent to a center section of the seal so that a gas pocket is formed therein, and cooling the mold while supplying the foammelt mixture thereto.

20 Claims, 4 Drawing Sheets

METHOD FOR FORMING A RECYCLABLE SEAL ON AN AUTOMOTIVE CLIMATE CONTROL SYSTEM DOOR

FIELD OF THE INVENTION

The present invention relates to methods for forming seals in general, and more specifically to a method for forming a recyclable seal on a substrate, such as a climate control door in an automobile ventilation system.

BACKGROUND OF THE INVENTION

Automotive climate control systems typically have a door, or damper, for regulating air flow from a conditioning element, such as a heater or air conditioner, through a duct to a desired area, such as a passenger compartment. Ideally, the door completely blocks air flow through the duct when closed. To that end, a pliable seal is typically placed on the door to achieve a tight fit with a mating surface.

Heretofore, various seals have been used for this purpose. One common seal, often referred to as a pressure sensitive adhesive (PSA) seal, consists of a urethane material having an adhesive strip on one side. The seal is placed on the door with the adhesive strip facing downwards and pressure is applied to "stick" the seal to the door. Although acceptable for many applications, urethane PSA seals have some drawbacks which make them undesirable for an automobile climate control system. For example, urethanes are an open-cell material able to collect moisture in which odor producing bacteria may grow. In addition, the PSA seals are packaged onto a cardboard base with a plastic film covering the adhesive side which must be removed and discarded before applying the seal to the door. Such a step increases the labor requirements to apply the seal while also producing waste, usually non-recyclable, in the form of the plastic film and cardboard base. Further, the "peel and stick" method used to apply the PSA seals is not consistently repeatable leading to inadequately applied seals.

Other methods for applying seals or gaskets to substrates are described in U.S. Pat. No. 5,382,397 (Turner, Jr.) and U.S. Pat. No. 5,164,136 (Comert et al.). In the Turner, Jr. patent, a controlled amount of liquid sealant material is metered from a bulk reservoir to a seam, such as along joined automobile body panels. The sealant material has a closed cell foam structure with a multitude of fine cells containing gas. Apparatus for mixing and metering an even flow of material is also described. The patent does not describe how to use the apparatus for applying the material to a substrate enclosed within a mold.

In the Comert et al. patent, one method disclosed consists of injecting a gasket material into a mold containing a substrate to form a gasket thereon, removing the substrate from the mold, and exposing the part to moisture to cure the material. The gasket material consists of a moisture curable semi-IPN (interpenetrating polymer network) made by blending at least two components, one being a primary polymer with isocyante end groups, the other being a non-crosslinked elastomer. Use of a primary polymer with isocyante end groups may result in cyanide by-products which must be carefully handled to avoid harmful consequences. In addition, the method requires exposure to moisture to effect curing of the material, and the blended material must therefore be kept from moisture until curing is desired. Further, while injection into a mold may work with the blended material described in the Comert et al. patent, it has been found not to work with other high-viscosity sealant materials due to back pressure in the mold cavity. Injection methods result in incomplete filling of the mold channel as well as a lower than desired seal durometer due to separation of the gas from the material.

There thus exists a need for applying a recyclable, closed-cell, high viscosity material seal to a substrate to provide a pliable seal in a method which does not require excessive manufacturing steps and which does not produce undesirable by-products.

SUMMARY OF THE INVENTION

The present invention overcomes the disadvantages of the related art by providing a method for forming a seal on a climate control system door within a mold by supplying a foam mixture to the mold channels and peripherally venting the channels. The method comprises the steps of placing the door into the mold so that the channels are adjacent to mating sections of the door having openings therethrough, melting a solid sealant material, mixing a foaming agent with the melted sealant material to produce a foammelt mixture, supplying the foammelt mixture under a predetermined pressure through an entry point in the mold in communication with the channels so as to flow through the channels and to flow through the openings such that an interconnected seal is formed on opposite sides of the door, venting the channels along substantially the entire length thereof so as to maintain a pressure differential across the foammelt mixture of less than approximately 15 psi to force the foaming agent to a center section of the channel such that a gas pocket is formed within a the sealant material, and cooling the mold while supplying the foammelt mixture thereto. The foammelt is thus attached to the door substrate via the openings through which foam passes during the process. A seal of desired cross-section is attained by having several standoffs in the mold. The mold is vented through a gap between mating halves of the mold of approximately 0.003 inches to 0.020 inches, and preferably 0.008 inches, which can be sustained by a knob-and-recess combination. The solid sealant material is preferably a styrenic block copolymer which is mixed with nitrogen gas as the foaming agent. The mold is cooled to a temperature between approximately 55° F. and 85° F.

An advantage of the present invention is a method for applying a seal to a climate control door which produces a seal which is moldable to a multitude of different shapes.

Another advantage is a method for applying a seal to a climate control door which produces a seal which contains no iso-cyanates or cyanide by-products.

Another advantage is a method for applying a seal to a climate control door which produces no scrap from offal or silicone impregnated cardboard.

Still another advantage of the present invention is a method for applying a seal to a climate control door which is less labor intensive than peel and stick methods with polyurethane seals, and consequently has a faster cycle time.

Yet another advantage is a method for applying a seal to a climate control door which has better repeatability than operator dependent peel and stick methodologies.

Another advantage of the present invention is a seal applied to a climate control door which does not absorb water thus cutting down on the amount of bacteria which grows on the seal.

Another advantage of the present invention is a seal which conforms to the mating surface over time to ensure a complete seal.

Yet another advantage of the present invention is a method for applying a seal to a substrate which uses a mold which is inexpensive, simple to build, and lightweight.

Still another advantage of the present invention is a method for applying a seal to a climate control door in which no rework is required for a malformed seal and in which the substrate and the seal can be recycled rather than reworked.

A feature of the present invention is a foam seal held to the substrate by interconnection of the seal through openings in the substrate.

Another feature is a seal made of a styrenic copolymer.

BRIEF DESCRIPTION OF THE DRAWINGS

These and other objects, advantages, and features of the present invention will be apparent to those skilled in the body sealing arts upon reading the following description with reference to the accompanying drawings, in which.

DETAILED DESCRIPTION OF THE PREFERRED EMBODIMENT

Figure 1:
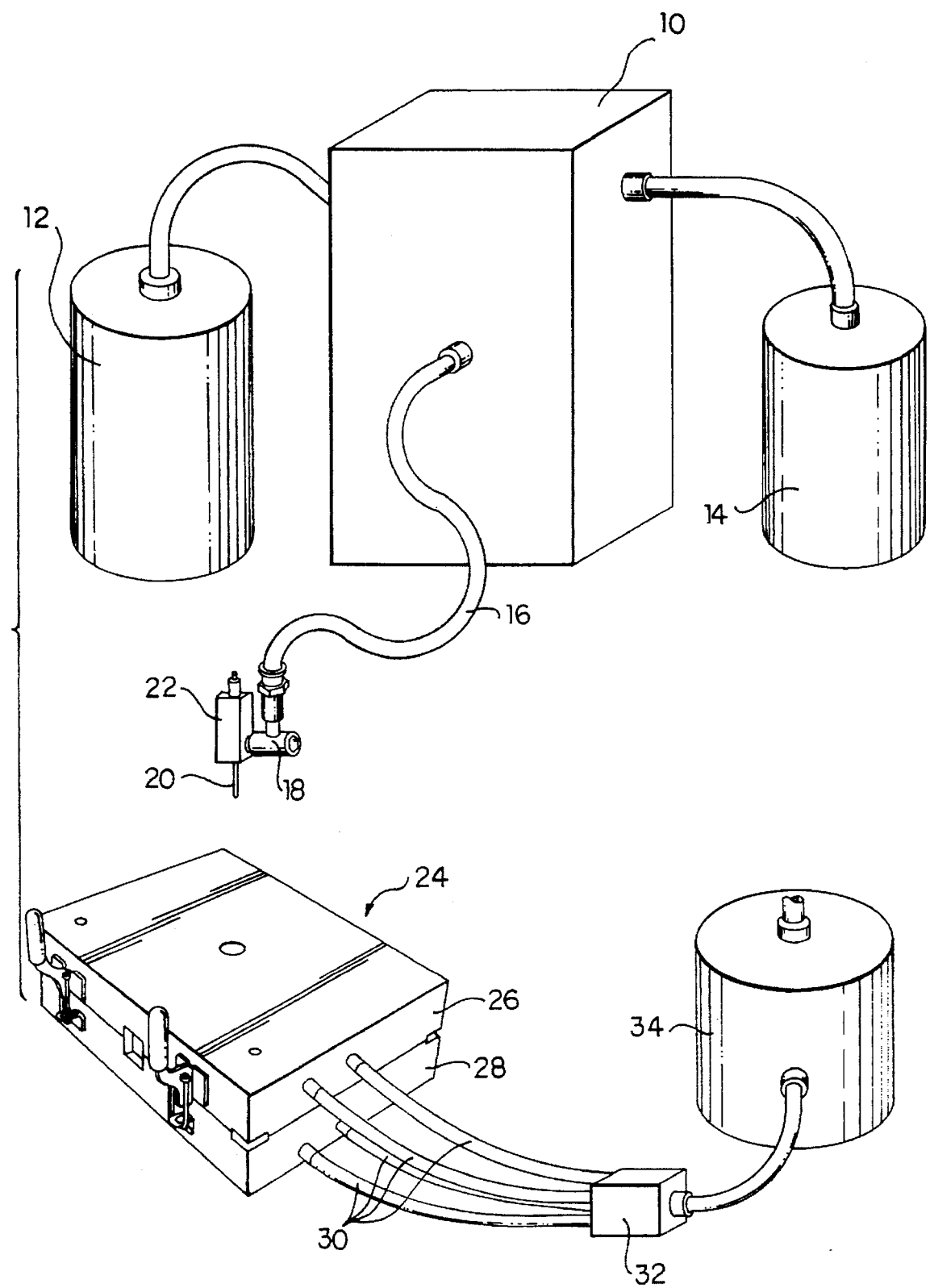
FIG. 1 is a perspective view of the apparatus for forming a seal on a substrate within a mold according to a method of the present invention.

Turning now to the drawings, in particular to FIG. 1 thereof, apparatus for applying a seal to a substrate in accordance with the present invention is shown. Beginning at the top of FIG. 1, a foam mixing machine 10 has a canister 12 in which a solid material, preferably a styrenic block copolymer, is heated for delivery to the foam mixing machine 10. A foaming agent, preferably nitrogen gas, is stored in a canister 14 for delivery to the mixing machine 10. The mixing of the seal and the foaming agent can be accomplished with systems available on the market, such as the FoamMix® system, as well as the system described in the aforementioned Turner, Jr. patent. Other foam mixing methods or apparatus known to those skilled in the art may likewise be used.

Delivery of the foammelt mixture, which for purposes of this disclosure is the mixture of the sealant material with the foaming agent, is through a hose 16 from the mixing machine 10. The hose 16 has a regulator 18 thereon which controls the pressure under which the foammelt is supplied through a supply pin 20 extending from a delivery head 22. Delivery head 22 and the supply pin 20 fit into a mold 24 as further described below. The mold 24 has an upper mold half 26 and a lower mold half 28 which are separately cooled through cooling hoses 30. A cooling pump 32 delivers cooling water from a reservoir 34 to the cooling hoses 30.

Figure 2:
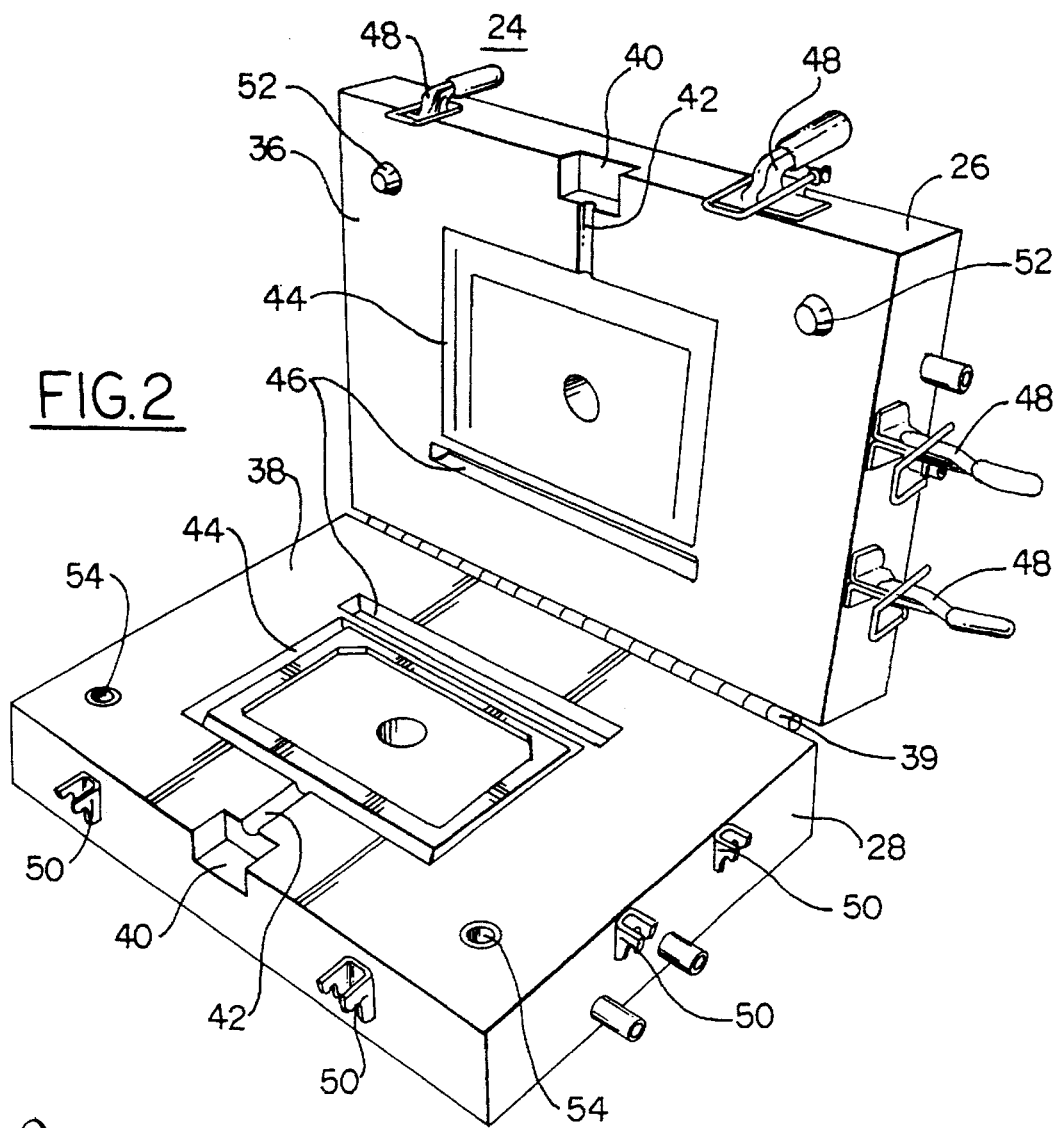
FIG. 2 is a perspective view of a mold with channels therein for receiving a foammelt mixture to form a seal in accordance with the present invention.
Figure 3:
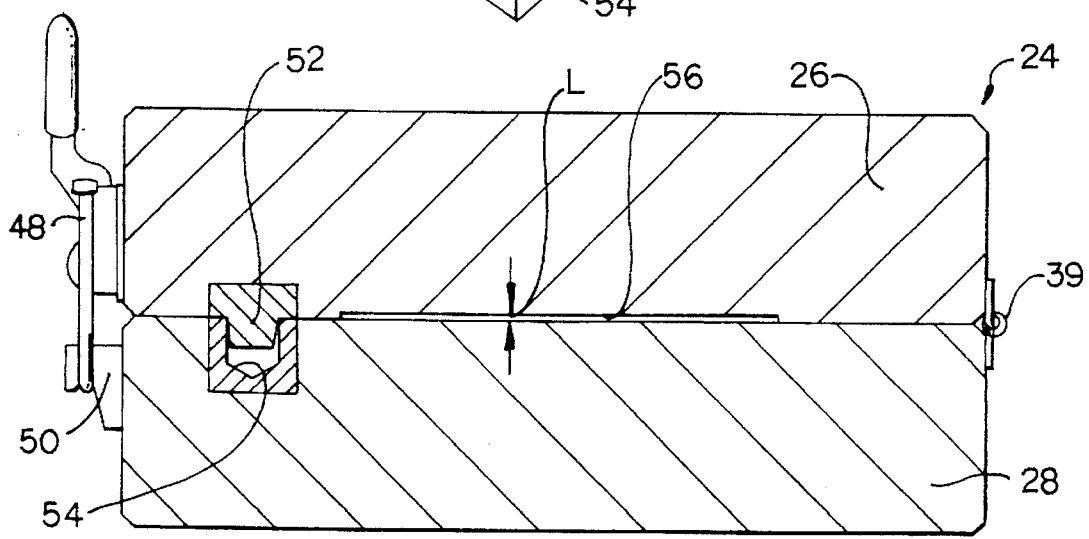
FIG. 3 is a side view of the mold of FIG. 2 in a shut position and showing a peripheral vent between mating halves of the mold.

Referring now to FIG. 2, the mold halves 26, 28 have inner surfaces 36, 38 respectively into which are formed a recess 40 and a slot 42 for receiving the delivery head 22 and supply needle 20, respectively. When mold halves 26, 28 are closed, as seen in FIG. 3, the slots 42 form a conduit through which supply needle 20 extends. The mold halves are connected by a hinge 39. Surfaces 36, 38 also have seal grooves 44 which receive the foammelt during the below described method. Stand off grooves 46 are also formed in surfaces 36, 38 to receive standoffs on the substrate. Hook latches 48 along the outer edges of mold half 26 connect with latches 50 along the edges of lower mold half 38. A pair of knobs 52 on surface 36 of upper mold half 36 mate with a pair of recesses 54 in surface 38 of lower mold half 28 for alignment purposes (FIGS. 2 and 3). When mold halves 26, 28 are closed and latched, as seen in FIG. 3, the mold 24 has a vent 56 which extends along the surfaces 36, 38 to the channel grooves 44. The vent 56 can be formed by machining one or both of the surfaces 36, 38 so that a distance L separates them. The distance L is between approximately 0.003 inches to 0.020 inches, and preferably is 0.008 inches, which has been found to provide sufficient ventilation to allow the foammelt to flow through the channels 44 while also preventing foammelt penetration through the vents 56 and the consequent flash along the edges of the seal. While only shown on one side in FIG. 3, such vents are preferably on each side of mold 24 and communicate with at least one quarter of the length of each channel groove 44, and preferably along substantially the entire length of channel groove 44.

Figure 4:
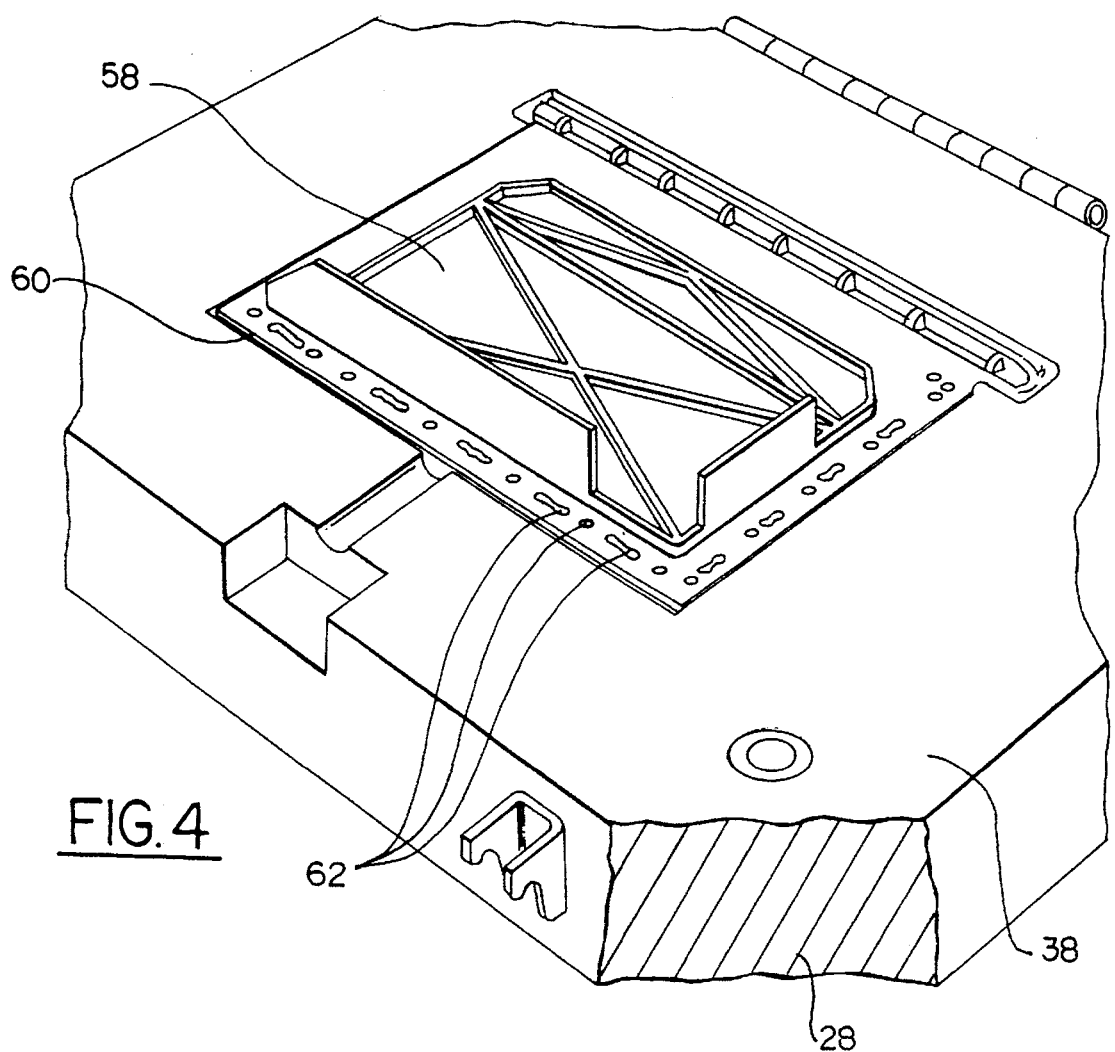
FIG. 4 is a perspective view of one half of the mold of FIG. 2 showing a door substrate mounted therein.
Figure 5:
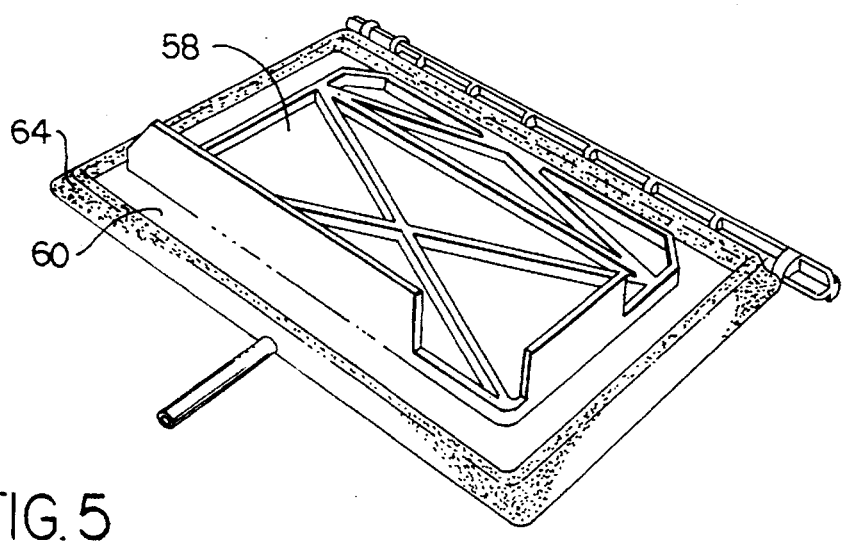
FIG. 5 is a perspective view of a door substrate having a seal applied thereto in accordance with the present invention.
Figure 6:
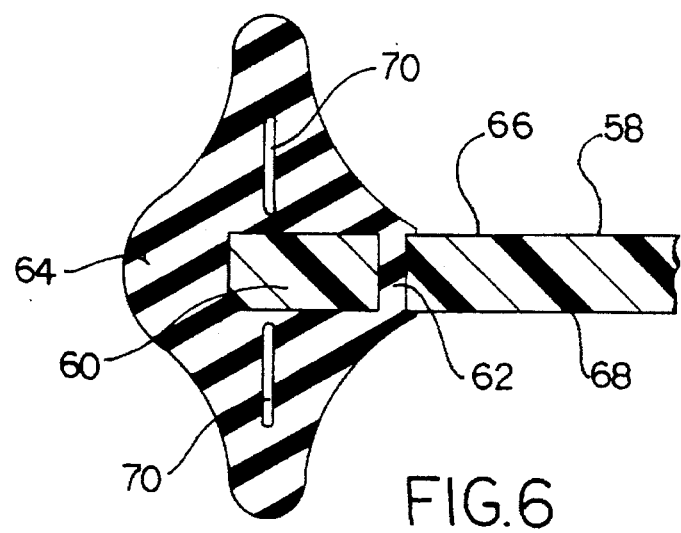
FIG. 6 is a sectional view of a seal applied in accordance with the present invention and showing interconnection of the seal on opposite sides of the door through an opening so as to maintain the seal mechanically to the door.

As seen in FIG. 4, a climate control system door 58 is placed in mold half 28 for application of a seal thereto. Along the periphery 60 of door 58 are a plurality of openings 62 which communicate between channel grooves 44 when mold halves 26, 28 are locked together. After the foammelt is supplied to the mold 24 (FIG. 1) as described below, a seal 64 is formed along the periphery 60 of door 58 (FIG. 5). The openings 62 communicate the foammelt between opposite sides 66, 68 of the door 58 to provide a mechanical connection between the door 58 and the seal 54 (FIG. 6).

The seal 64 is formed on the door 58 as follows. The door 58 is placed into the mold 24 so that the channel grooves 44 are adjacent to mating of sections of the door 58, which typically are along the peripheral edge 60. The openings can then communicate the foammelt as described above to form the mechanical connection with the door 58. The solid sealant material, for example the styrenic block copolymer, is melted in the mixing machine 10 and mixed with the nitrogen foaming agent to produce a foammelt mixture. This foammelt mixture is supplied, under a predetermined pressure, preferably between approximately 50 psi to 150 psi, to the mold 24 through the slot 42 which has the supply pin 20 inserted therein. The foammelt thus flows into the channels 44 on either side of the door 58 and flows through the openings 62 such that the interconnected seal 64 (FIG. 6) is formed on opposite sides of the door 58. The channels 44 are vented along substantially the entire length thereof so as to maintain a pressure differential across the foammelt mixture of less than 15 psi. Such a pressure forces the foaming agent to a center section 70 of the seal 64 such that a gas pocket is formed within the seal 64 (FIG. 6). The mold is cooled while supplying the foammelt mixture thereto, preferably to a temperature between approximately 55° F. and 85° F.

Figure 7:
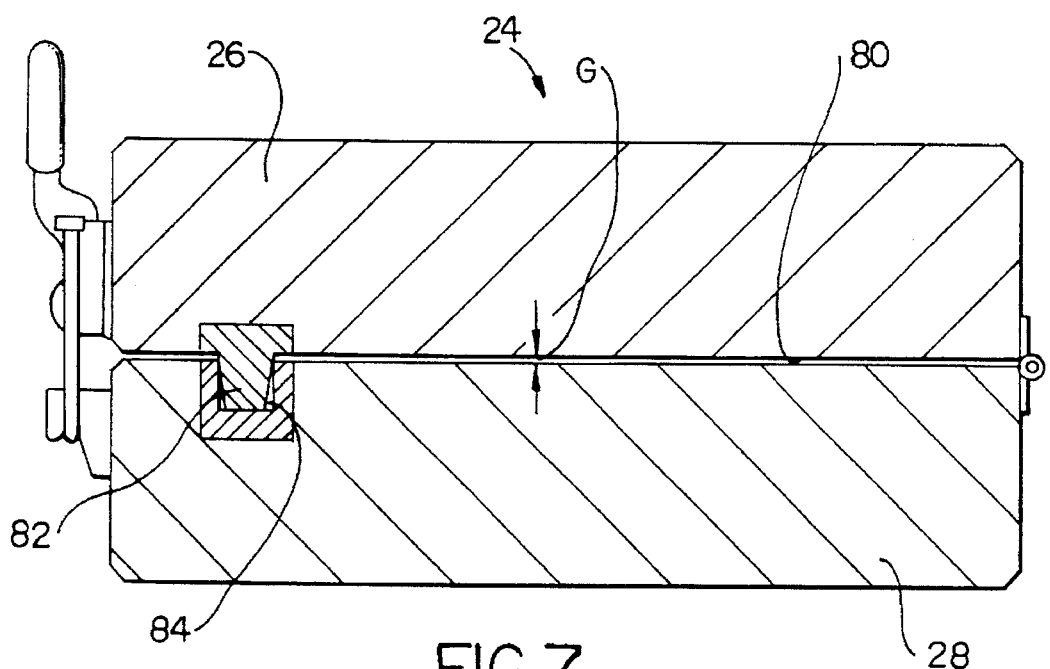
FIG. 7 is a side view similar to FIG. 3 but showing peripheral vents in the mold sustained by separating the mold halves with a knob-end-recess combination.

In a preferred embodiment shown in FIG. 7, the mold 24 is vented through a vent 80 around substantially the entire periphery thereof. The vent 80 is formed by knobs 82 which fit within recesses 84 to sustain the gap G between mold halves 26,28 when locked together. The gap G is between approximately 0.003 inches to 0.020 inches, and preferably is 0.008 inches, which provides sufficient ventilation to allow the foammelt to flow through the channels 44 while also preventing foammelt penetration through the vent 80 and the consequent flash along the edges of the seal 64.

Upon entering the mold 24, the outer surface of the foammelt solidifies against the channels 44. The core of the foammelt remains molten and continuously advances to fill the channel 44. The nitrogen is encapsulated in the molten material due to solidification along the surface of the channel 44. That is, as the foammelt solidifies from the channel inward toward the molten core, the nitrogen within the foammelt is forced to the center 70 of the foammelt causing it to form a pocket of gas therein. It should be understood that air within the channel 44 in the mold in vented through the vents 56, and the nitrogen used as a foaming agent remains within the center 70 of the seal 64, and is not vented. The seal thus formed is pliable so as to take the shape of the object facing it over time.

Without venting the mold 24 peripherally as described herein, the foammelt being supplied to the channels 44 will "freeze off". That is, it will solidify too fast causing a plug which prevents material from being forced completely around the channel 44. Prior processes will thus not work with the styrenic block copolymers and other closed-cell foam sealants. If the supply pressure is increased, the foaming agent is forced out of the material thus causing it to "freeze off" even faster. Thus, it is believed that supplying the foammelt so that a relatively low differential pressure exists, less than 15 psi, by peripherally venting the mold, which is counter-intuitive to what is normally done in an injection molding process, allows the foammelt to completely fill the channel and prevent the "freeze off" phenomena.

Although the preferred embodiment of the present invention has been disclosed, various changes and modifications may be made thereto by one skilled in the art without departing from the scope and spirit of the invention as set forth in the appended claims.

We claim:

1. A method for forming a seal on a substrate comprising the steps of:
   melting a solid sealant material;
   mixing a foaming agent with the melted sealant material to produce a foammelt mixture;
   placing said substrate into a mold having channels cut in desired locations therein;
   supplying the foammelt mixture through an entry point in said mold in communication with said channels;
   venting said channels directly to atmosphere along at least one-quarter of the length thereof so as to maintain a pressure differential across said foammelt mixture of less than approximately 15 psi; and
   cooling the mold while supplying the foammelt mixture thereto.

2. A method according to claim 1 wherein the channels are vented through a plurality of vents in the mold having a width of between approximately 0.003 inches and 0.020 inches.

3. A method according to claim 1 wherein the solid sealant material is a styrenic block copolymer.

4. A method according to claim 1 wherein the foaming agent is nitrogen gas.

5. A method according to claim 1 wherein the mold is cooled to a temperature between approximately 55° F. and 85° F.

6. A method according to claim 1 wherein the mold is made of aluminum.

7. A method for forming a seal on a climate control system door within a mold having channels therein at desired locations, the method comprising the steps of:
   placing the door into the mold;
   melting a solid sealant material;
   mixing a foaming agent with the melted sealant material to produce a foammelt mixture;
   supplying the foammelt mixture through an entry point in said mold in communication with the channels;
   venting the channels directly to atmosphere along substantially the entire length thereof so as to maintain a pressure differential across the foammelt mixture of less than approximately 15 psi; and
   cooling the mold while supplying the foammelt mixture thereto.

8. A method according to claim 7 wherein the channels are vented through a gap of between approximately 0.003 inches to 0.020 inches between mating halves of the mold.

9. A method according to claim 8 wherein the solid sealant material is a styrenic block copolymer.

10. A method according to claim 9 wherein the foaming agent is nitrogen gas.

11. A method according to claim 10 wherein the mold is cooled to a temperature between approximately 55° F. and 85° F.

12. A method according to claim 7, further including the step of forming a gas pocket within the sealant material as the foammelt mixture is supplied to the mold.

13. A method according to claim 7, further including the step of forming the seal on opposite sides of the door by passing the foammelt mixture through openings in the door in communication with the channels.

14. A method for forming a seal on a climate control system door within a mold having channels therein at desired locations, the method comprising the steps of:
   placing the door into the mold so that the channels are adjacent to mating sections of the door having openings therethrough;
   melting a solid sealant material;
   mixing a foaming agent with the melted sealant material to produce a foammelt mixture;
   supplying the foammelt mixture under a predetermined pressure through an entry point in the mold in communication with the channels so as to flow through the channels and to flow through the openings such that an interconnected seal is formed on opposite sides of the door;
   venting the channels directly to atmosphere along substantially the entire length thereof so as to maintain a pressure differential across the foammelt mixture of less than approximately 15 psi to force the foaming agent to a center section of the channel such that a gas pocket is formed within a the sealant material; and
   cooling the mold while supplying the foammelt mixture thereto.

15. A method according to claim 14 wherein the channels are vented through a gap between mating halves of the mold of approximately 0.003 inches to 0.020 inches.

16. A method according to claim 15 wherein the gap between mating halves of the mold is sustained by a knob-and-recess combination.

17. A method according to claim 14 wherein the solid sealant material is a styrenic block copolymer.

18. A method according to claim 14 wherein the foaming agent is nitrogen gas.

19. A method according to claim 14 wherein the predetermined pressure is between approximately 50 psi and 200 psi.

20. A method according to claim 14 wherein the mold is cooled to a temperature between approximately 55° F. and 85° F.

* * * * *